United States Patent

Pratt et al.

[15] 3,688,223

[45] Aug. 29, 1972

[54] ELECTROMECHANICAL FILTERS COMPRISING INPUT-OUTPUT INTERDIGITAL ELECTRODES HAVING DIFFERING AMPLITUDE AND FREQUENCY CHARACTERISTICS

[72] Inventors: Ronald George Pratt, Reigate; William Willis, Sussex; John Stephenson Singleton, Epsom, all of England

[73] Assignee: U.S. Philips Corporation

[22] Filed: Sept. 17, 1970

[21] Appl. No.: 73,120

[30] Foreign Application Priority Data

Sept. 17, 1969 Great Britain..........45,801/69

[52] U.S. Cl.......................................333/72, 310/8.2

[51] Int. Cl.............................H03h 7/02, H03h 9/26

[58] Field of Search.....333/30, 72; 310/8.2, 8.3, 9.8, 310/9.1; 317/235; 178/5.4

[56] References Cited

UNITED STATES PATENTS

| | | | |
|---|---|---|---|
| 3,582,838 | 6/1971 | DeVries | 333/72 |
| 3,582,840 | 6/1971 | DeVries | 333/72 |
| 3,582,540 | 6/1971 | Adler | 178/5.4 |
| 3,200,354 | 8/1965 | White | 333/72 |
| 3,283,264 | 11/1966 | Papadakis | 333/6 |

*Primary Examiner*—Paul L. Gensler
*Attorney*—Frank R. Trifari

[57] ABSTRACT

An intermediate frequency filter is formed by a strip of piezo-electric material having input and output interdigital transducers respectively to launch and receive a surface elastic wave. The combined frequency responses of the two transducers determine the overall filter response. The respective transducer responses are made to differ, especially with regard to the positions of the nulls. This enables a more satisfactory overall response to be obtained.

Direct electrical breakthrough from input to output is effectively reduced by placing an earthed conducting layer on the opposite surface of the strip from the transducers. By using a piezo-electric material which is also a semiconductor, a conducting barrier can be formed by diffusion or ion implantation techniques, between the transducers and this barrier can be connected to the conducting layer.

2 Claims, 8 Drawing Figures

Patented Aug. 29, 1972

3,688,223

5 Sheets-Sheet 1

Figure 1A:
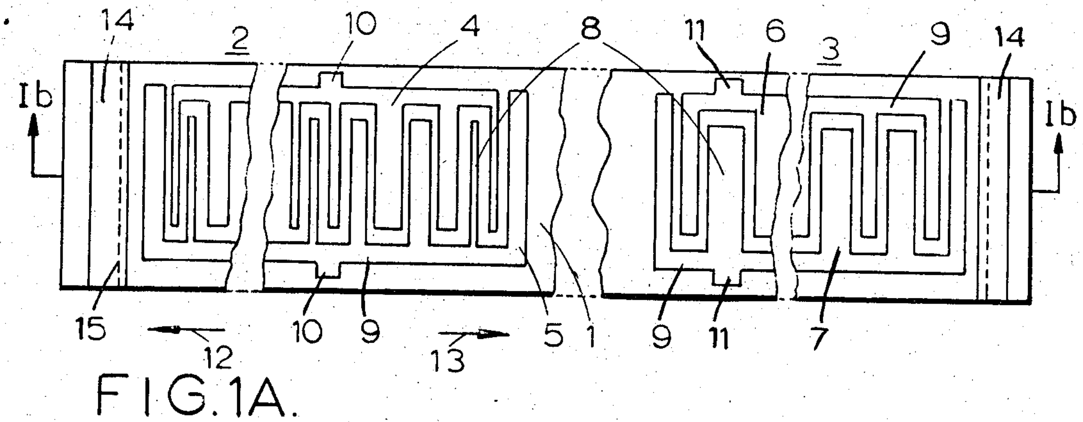

INVENTORS
R. G. PRATT
W. WILLIS
J. S. SINGLETON
BY
AGENT

INVENTORS
R. G. PRATT
W. WILLIS
J. S. SINGLETON
BY
[signature]
AGENT

INVENTORS
R. G. PRATT
W. WILLIS
J. S. SINGLETON
BY
AGENT

INVENTORS
R. G. PRATT
W. WILLIS
J. S. SINGLETON
BY
[signature]
AGENT

*INVENTORS*
R. G. PRATT
W. WILLIS
J. S. SINGLETON
*BY*
AGENT

ELECTROMECHANICAL FILTERS COMPRISING INPUT-OUTPUT INTERDIGITAL ELECTRODES HAVING DIFFERING AMPLITUDE AND FREQUENCY CHARACTERISTICS

This invention relates to improvements in or relating to electro mechanical filters and especially to filters employing surface elastic waves.

In the manufacture of integrated circuits it is virtually impossible to form inductors for frequency selective circuits operating at frequencies below the microwave band. It has hitherto been impracticable therefore to manufacture intermediate frequency amplifiers for television sets, entirely in an integrated circuit form.

It is an object of the present invention to provide an improved form of frequency selective circuit which employs surface elastic waves.

In accordance with one feature of the invention there is provided a surface elastic wave filter comprising a body of piezo-electric material on one surface of which is arranged a first and a second array formed by respective pairs of interdigital transducer electrodes so that an electrical signal applied to one pair of electrodes results in the production of an elastic surface wave which propagates past the other pair of electrodes to produce an electrical output signal therefrom, said first and second arrays having respective amplitude-frequency characteristics which may differ substantially one from the other over at least one predetermined portion of the pass-band. Thus a better control of the overall response curve of a surface elastic wave filter can be obtained in regions of the pass-band wherein it is desired that the slope of the response curve should be zero or have a relatively low value. This can be carried out, for example, by arranging that the nulls in the response curve of one transducer does not occur at the same frequency as the nulls in the response curve of the other transducer. However, when the rejection of a band of frequencies is required, for example at the frequency of the adjacent channel sound carrier of a television intermediate frequency filter, the coincidence of the frequencies of nulls in both response curves may be desirable to enhance the rejection effect.

In accordance with another feature of the invention there is provided an elastic surface wave device comprising a thin body of piezo-electric material having at least co-operating input and output pairs of interdigital transducer electrodes on one surface thereof and a conductive region arranged on the opposite surface so that when said conductive region is connected to ground, electrical coupling between said respective pairs of transducer electrodes, other than through the medium of elastic surface wave transmission, is substantially reduced. The conductive region can be a metal layer or it can be a silicon substrate whose conductivity is higher than that of a piezo-electric material applied thereto in the form of a layer.

When the piezo-electric material is also a semiconductor a region of increased conductivity can be formed across said body such as for example a diffusion technique or by ion implantation, said region of increased conductivity being connected to said conductive region on said surface. This conductive region will further reduce the unwanted electrical coupling.

The orientation of the piezo-electric axis of the body can be chosen so that the coupling factor is a maximum. The thermal coefficients of expansion and change of velocity can be chosen so the effects of temperature on the filter response is substantially reduced.

Surface elastic waves can be launched by means of a transducer comprising an interdigital electrode array deposited on the surface of a piezo-electric substrate (See, for example, Direct Piezo-electric Coupling To Surface Elastic Waves, R. M. White et al, Applied Physics Letters, Vol. 7, No. 12, Dec. 15, 1965, pages 314–316). Such a transducer will be frequency selective, dependent on the spacing and dimensions of the electrodes of the array. A simple form of array hitherto proposed, comprises equally spaced fingers of equal dimensions and this would give a response substantially of the form sin $x/x$ where $x$ is a term related to the frequency of the input signal. Such a transducer will in general transmit a surface wave equally in the two directions along the surface of the substrate in a direction normal to the individual fingers of the interdigital electrodes.

One form of selective filter employing two interdigital transducers, one to launch and one to detect the elastic surface wave, in which the selectivity is derived from the delay introduced by the passage of the surface wave from one transducer to the other, is described and claimed in our co-pending U.S. Pat. Application Ser. No. 191801 filed Oct. 22, 1971 which is a continuation of Ser. No. 812025 now abandoned.

Another form of selective filter can be manufactured in which the selectivity is derived entirely from the frequency-amplitude and frequency-phase characteristics of the launching and/or the detecting transducer.

An interdigital elastic surface wave transducer can be considered as an array of surface wave sources arranged one behind the other in the direction of propagation of the wave. Each finger of the interdigital electrodes can be considered as a source giving rise to a wavelet, and the wavelets generated by all the sources combine to produce the resultant output elastic surface wave of the transducer. The transducer is thus a form of end-fire array and the amplitude and phase of the resultant output wave of the array as a function of frequency, will be determined by the relative intensity and the spacing of the respective sources. The intensity of a source may be increased up to an optimal maximum by increasing the width of the corresponding digital electrode. When the width is increased beyond this value the source strength will tend to fall but the capacitance of the electrode will continue to increase with the width. The intensity of the source can also be altered by altering the length of the corresponding digital electrode. In general the intensity of a digital electrode, acting as a discrete source, will depend on the effective area of the electrode, and also on the disposition of adjacent digital electrodes. These factors can also affect the elastic surface wave output of a respective electrode as a function of frequency, although the source term variation will normally be small when compared with the variation of output with frequency that can be provided by the overall effect of the array.

The relative spacing of one source from another, represented by the corresponding digital electrodes, can be readily computed together with the respective source strength, in order to provide a desired frequency response. It is desirable however that the time delay introduced into the signal by the filter, should be independent of the frequency. This can be achieved by arranging that the variation in the area and spacing of the fingers and in the sign and the magnitude of the voltage applied to the individual fingers, occurs in a manner balanced symmetrically or antisymmetrically about the center line of the transducer.

The design of the filter may require some of the fingers to be only a small number of acoustic wavelengths long and this can result in dispersion losses. It is possible to reduce these losses by guiding the surface wave between the transducer for example by applying a thin gold film onto the surface.

Figure 1B:
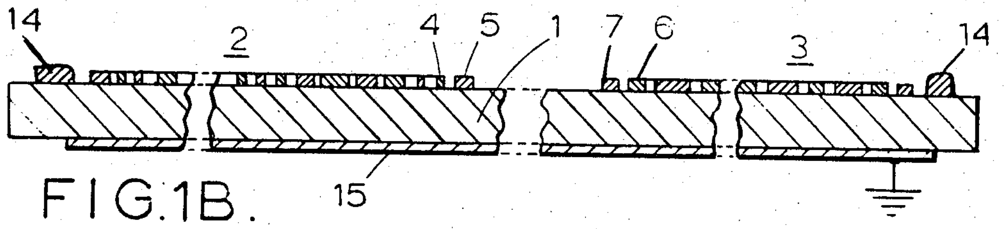
Figure 2:
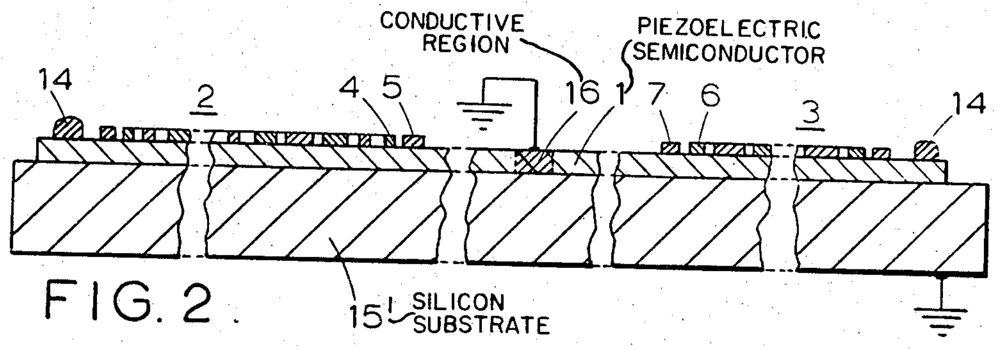
Figure 3:
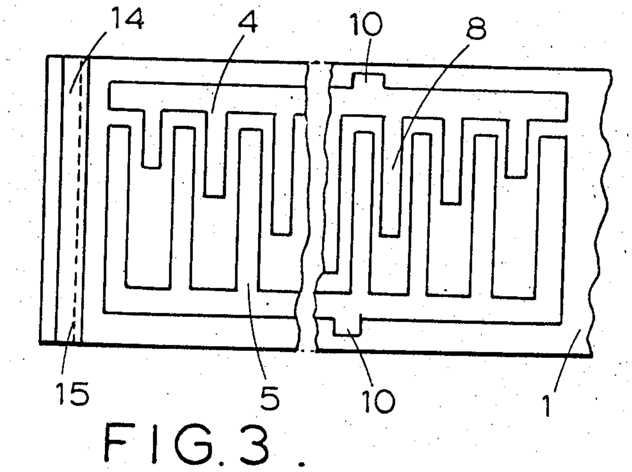
Figure 4:
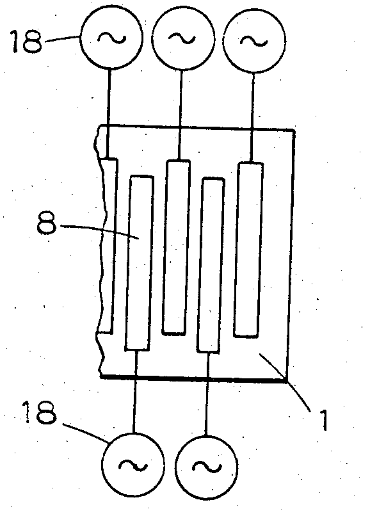
Figure 5A:
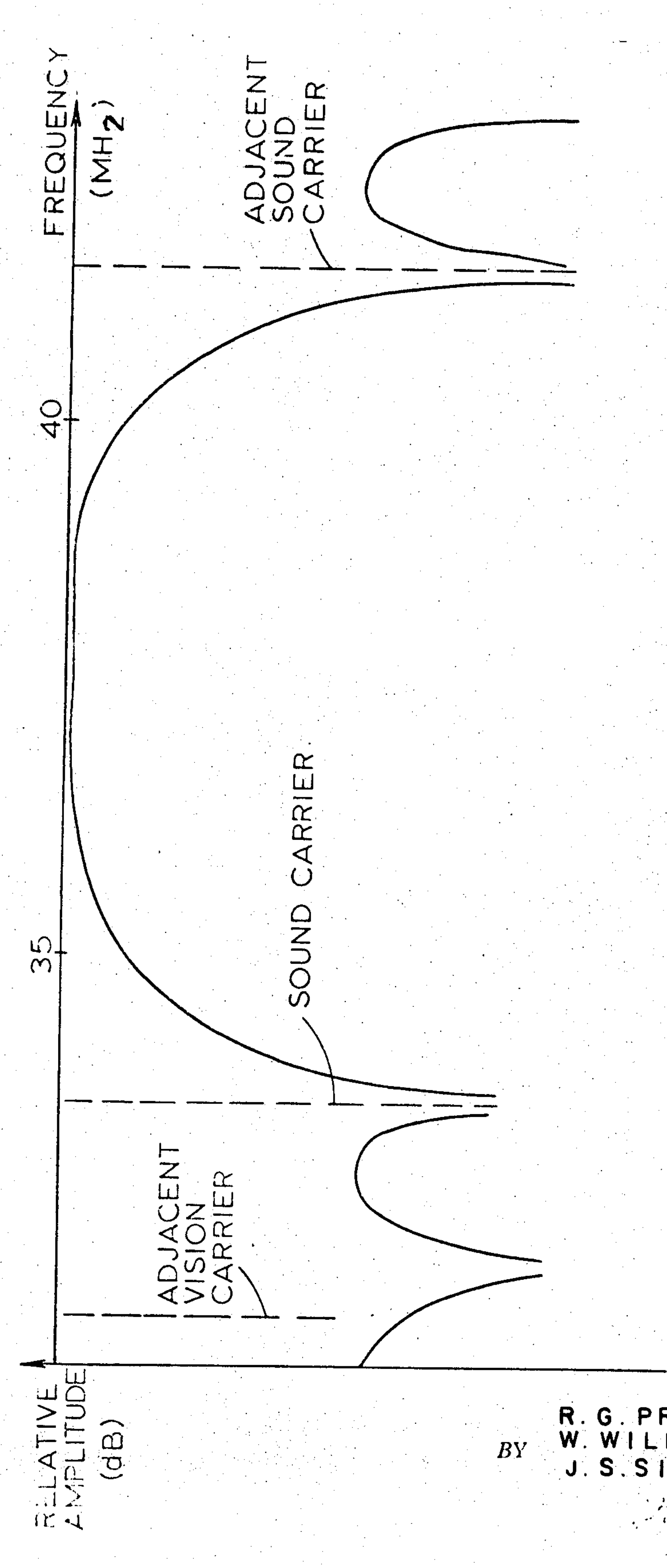
Figure 5B:
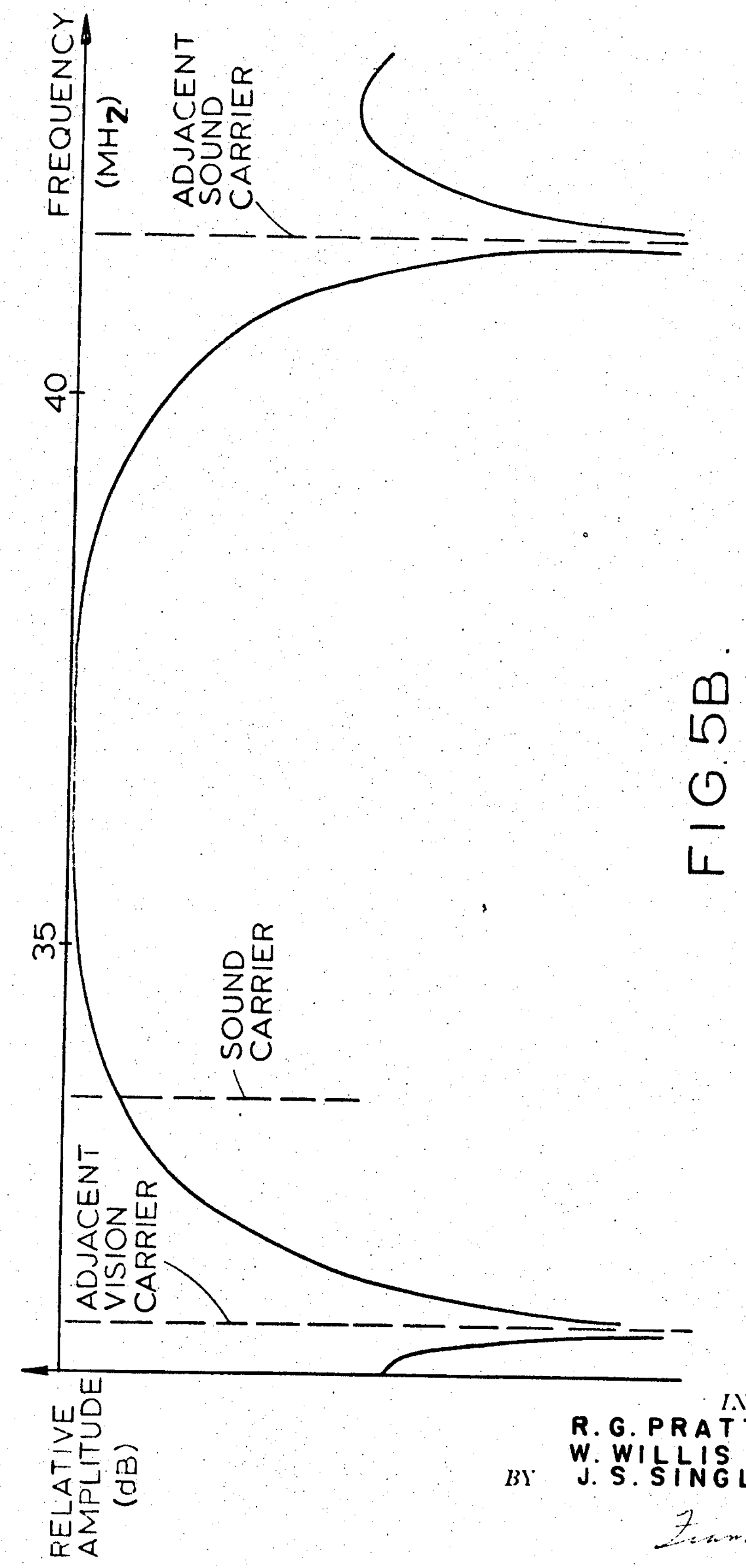
Figure 5C:
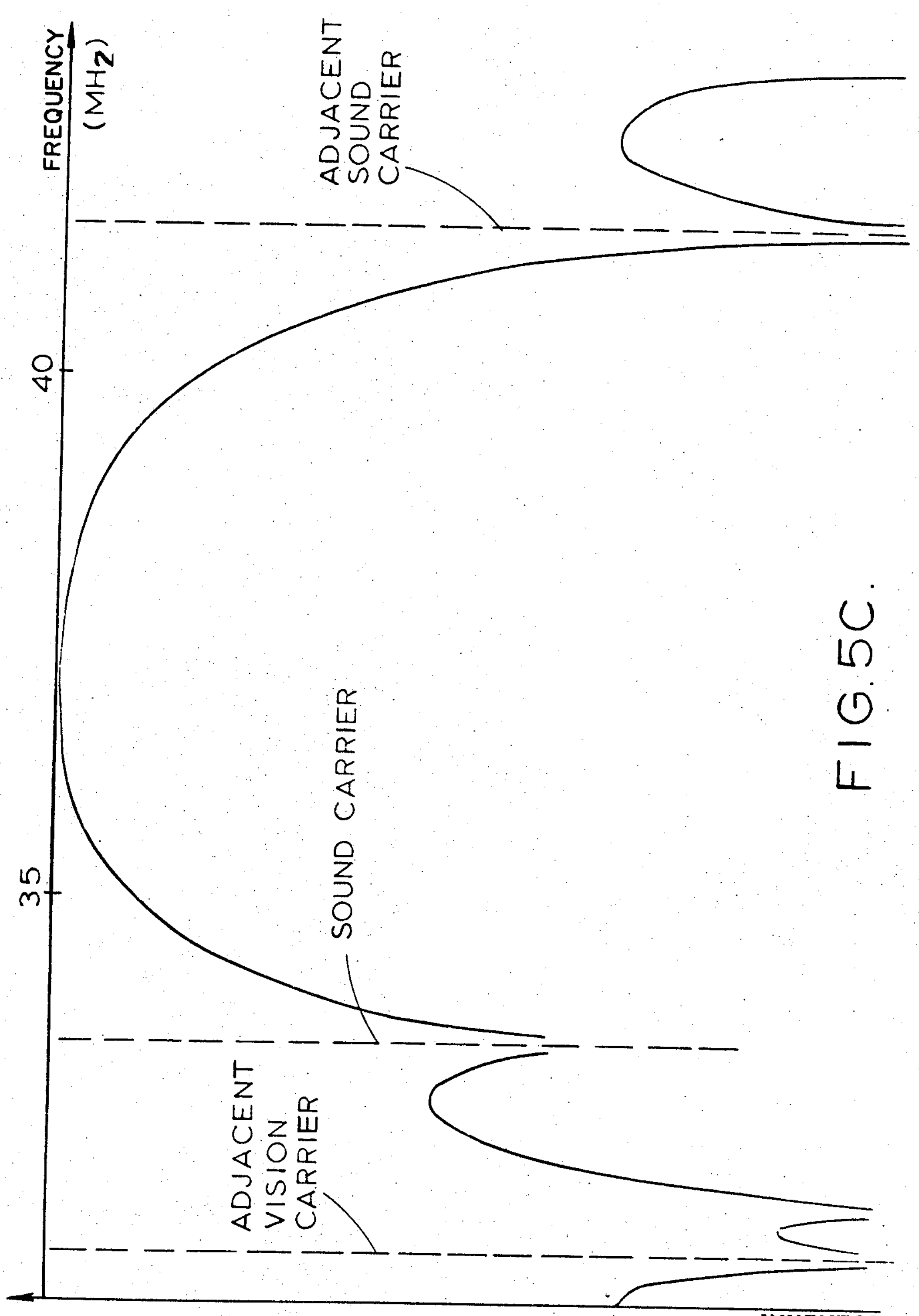

In order that the present invention may be clearly understood and readily carried into effect, various embodiments and features thereof will now be described by way of example with reference to the accompanying drawings of which:

FIGS. 1*a* and 1*b* show schematically in plan and longitudinal section, a filter element embodying the invention, FIG. 2 shows in longitudinal section an alternative embodiment of the filter element, FIG. 3 is a detail illustrating an alternative form of transducer arrangement, FIG. 4 is a detail illustrating a transducer arrangement in which the fingers are fed from individual voltage sources, FIGS. 5*a* and 5*b* are graphs depicting the amplitude-frequency characteristics of the input and output transducer arrays of the filter of FIG. 1, and FIG. 5*c* is a graph showing the overall transmission characteristic of the filter of FIG. 1.

Reference will now be made to FIGS. 1*a* and 1*b*, which show schematically in plan and longitudinal section an elastic surface wave television intermediate frequency filter element embodying the invention. The filter element comprises a body 1 in the form of a wafer of a piezo-electric material, suitably lithium niobate, on which is formed two arrays 2, 3, of interdigital metal electrodes. Each array 2, 3 comprises respectively a pair 4, 5 and 6, 7 of electrodes, each pair being made up of a plurality of substantially parallel fingers 8 linked by connecting portions 9. Electrical connections are made to the respective transducers via terminal connections 10, 11. Preferably the terminal connections connected to the fingers 8 of the respective arrays 2 and 3 which are adjacent each other, are grounded. Electrical input signals are applied to terminals 10 and give rise to surface elastic waves which are related to the electrical input signal by means of the frequency-amplitude and the frequency-phase characteristics of the array 2. These waves propagate in the direction normal to the fingers 8 of the array 2. The wave travelling in the direction of the arrow 12 is absorbed by the wave damping material 14 which can be a layer of wax. The surface elastic waves which propagate in the direction 13 give rise to an electrical output signal at the terminals 11 as they traverse the array 3. The electrical output signal is related to the surface elastic wave by means of the frequency-amplitude and frequency-phase characteristic of the array 3. The electrical output signal is therefore related to the electrical input signal, by the product of the respective characteristics of the arrays 2 and 3.

A conductive region 15 is arranged on the surface of the wafer 1 facing that on which arrays 2 and 3 are formed. The conductive region 15 can be a layer of metal. The region 15 should at least cover the region between arrays 2 and 3 and it may sometimes be desirable to extend it beneath the two arrays. The region 15 is electrically connected to ground with respect to the the electrical signals present at the arrays 2 and 3.

In an alternative embodiment, the conductive region can be a silicon substrate forming a part of an integrated circuit, and the piezo-electric body 1 can take the form of a layer of piezo-electric semiconductor, suitably cadmium sulphide, deposited or grown on the surface of the silicon substrate. FIG. 2 illustrates in longitudinal section, a surface elastic wave filter according to this embodiment, in which a piezo-electric semi-conducting layer of cadmium sulphide is applied to a silicon substrate 15'. FIG. 2 also shows a further feature of the invention in which a region 16 of enhanced conductivity is produced in the cadmium sulphide layer 1, suitably by diffusion or by ion implantation techniques. The region 16 extends across the width of the layer 1, and is connected to ground via the silicon substrate, or via a suitable further electrical connection. Thus the region 16 forms an additional electrical screen between the arrays 2 and 3, enabling the electrical coupling between he arrays 2 and 3 to be further reduced.

FIG. 1 illustrates how the widths and spacing of the fingers 8 can be varied along the length of a transducer 2 in order to control the transfer characteristic thereof. FIG. 3 illustrates how the relative lengths of the fingers 8 can be varied in order to control the transfer characteristic. FIG. 4 illustrates that the fingers 8 may be individually fed from voltage sources 18 of differing magnitude. This can readily be carried out by using normal integrated circuit techniques and the sources can be individual semiconductor active devices, for example transistors or M.O.S.T.'s, or can be derived from a potentiometer arrangement.

According to a feature of the invention the transfer characteristic of the arrays 2 and 3 may be arranged to be different at least over that part of the intermediate frequency pass-band in which the higher modulation frequencies occur. For example, this can be effected by using different numbers of fingers and different finger lengths and spacings in the two transducers. In this way it has been found possible to obtain a satisfactory overall transfer characteristic. One array provides a null at the adjacent vision carrier frequency and the other a null at the sound carrier frequency. Rejection at the adjacent sound carrier frequency is enhanced however by causing nulls in the two transfer characteristics respectively to coincide at this frequency.

The frequency pass-bands of the arrays 2 and 3 are indicated graphically in FIGS. 5*a* and 5*b* respectively, and that of the combined arrays in FIG. 5*c*.

According to another feature of the invention it is also preferable to choose the piezo-electric material and the orientation thereof, so that the transfer characteristics of the arrays 2, 3 do not alter substantially with temperature. Since these characteristics depend on the source spacing in the direction of propagation, and the velocity of propagation of the elastic surface waves, it is desirable that the linear expansion coefficient of the array in the propagation direction should be balanced by a corresponding coefficient of increase of the elastic surface wave propagation velocity, so that the array factor remains substantially constant.

I claim:

1. An electromechanical filter comprising a layer of piezo-electrical material, first transducing means arranged on one surface of said layer for launching elastic waves derived from input electrical signals along said surface, second transducing means arranged on said surface for detecting said waves to produce output electrical signals, said first and second transducing means being frequency-selective arrays formed by respective pairs of interdigital electrodes and having amplitude and frequency characteristics differing substantially from one another over at least one predetermined portion of a frequency pass-band, and a conductive region on the surface of said layer opposite to said surface where said first and second transducing means are arranged for reducing coupling between said first and second transducing means other than by means of said surface elastic waves, said conductive region comprising a silicon substrate applied as a layer and having a conductivity higher than that of said piezo-electrical material.

2. An electromechanical filter comprising a layer of piezo-electrical material, said piezo-electrical material being a semi-conductor having a region of increased conductivity formed across said layer, first transducing means arranged on one surface of said layer for launching elastic waves derived from input electrical signals along said surface, second transducing means arranged on said surface for detecting said waves to produce output electrical signals, said first and second transducing means being frequency-selective arrays formed by respective pairs of interdigital electrodes and having amplitude and frequency characteristics differing substantially from one another over at least one predetermined portion of a frequency pass-band, and a conductive region on the surface of said layer opposite to said surface where said first and second transducing means are arranged for reducing coupling between said first and second transducing means other than by means of said surface elastic waves, said region of increased conductivity being connected to said conductive region.

* * * * *